(12) United States Patent
Shibuya et al.

(10) Patent No.: US 6,465,134 B1
(45) Date of Patent: Oct. 15, 2002

(54) GEL ELECTROLYTE AND GEL ELECTROLYTE BATTERY

(75) Inventors: Mashio Shibuya, Miyagi (JP); Shuji Goto, Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/499,448

(22) Filed: Feb. 7, 2000

(30) Foreign Application Priority Data

Feb. 19, 1999 (JP) .......................................... 11-041456

(51) Int. Cl.[7] .................. H01M 6/24; H01M 10/08; H01M 10/10
(52) U.S. Cl. .................. 429/300; 429/303; 429/331; 429/326
(58) Field of Search ................ 429/300, 218, 429/303, 331, 326, 327

(56) References Cited

U.S. PATENT DOCUMENTS

| 5,296,318 A | * 3/1994 | Gozdz ................ 429/192 |
| 5,667,910 A | * 9/1997 | Takeuchi ............. 429/128 |
| 5,709,968 A | * 1/1998 | Shimizu ............. 429/198 |
| 5,807,645 A | * 9/1998 | Takeuchi ............. 429/218 |

FOREIGN PATENT DOCUMENTS

| EP | 0724305 A1 | 7/1996 |
| EP | 0746050 A1 | 12/1996 |
| EP | 0862232 A1 | 9/1998 |
| EP | 0892452 A2 | 1/1999 |
| JP | 11007981 | 1/1999 |

* cited by examiner

Primary Examiner—Patrick Ryan
Assistant Examiner—Mark Ruthkosky
(74) Attorney, Agent, or Firm—Sonnenschein, Nath & Rosenthal (57) ABSTRACT

A gel electrolyte comprised of a non-aqueous electrolytic solution immersed in a matrix polymer, in which ion conductivity of a solvent is improved and superior cyclic characteristics are achieved. To this end, the gel electrolyte includes an electrolyte, a matrix polymer and a non-aqueous solvent. The non-aqueous solvent is a mixed solvent of ethylene carbonate (EC), propylene carbonate (PC) and γ-butyrolactone (GBL). The non-aqueous solvent is of a weight composition in an area in a triangular phase diagram (EC, PC, GBL) surrounded by a point (70, 30, 0), a point (55, 15, 30), a point (15, 55, 30) and a point (30, 70, 0). A gel electrolyte battery employing this electrolyte is also disclosed.

11 Claims, 7 Drawing Sheets

GEL ELECTROLYTE AND GEL ELECTROLYTE BATTERY

BACKGROUND OF THE INVENTION

1. Field of the Invention

This invention relates to a gel electrolyte comprised of a non-aqueous electrolytic solution immersed in a matrix polymer and a gel electrolyte battery employing this electrolyte.

2. Description of the Prior Art

Recently, more and more importance is attached to the battery as a light source for a portable electronic equipment, such as a video camera or a notebook type personal computer. For reducing the size and the weight of the electronic equipments, there is raised a demand for a battery which is not only large in capacity but also is lightweight and space-saving. From such viewpoint, a lithium battery having a high energy density and a high output density is suited as a light source for the portable electronic equipment.

Of the lithium batteries, a wide variety of configurations, such as batteries exhibiting flexibility and a high degree of shape freedom, sheet batteries of large area and reduced thickness or card batteries of reduced area and reduced thickness, are desired. In the conventional technique of sealing battery elements comprised of a positive electrode and a negative electrode and an electrolytic solution in the interior of a metal outer can, it is difficult to fabricate the batteries of these various configurations. On the other hand, due to the use of the electrolytic solution, the manufacturing process is complicated, or measures need to be taken against leakage of the electrolytic solution.

In order to overcome these problems, there have been proposed batteries employing a solid electrolyte employing in turn an electrically conductive organic high polymer or inorganic ceramics or those employing a gel-like solid electrolyte comprised of an electrolytic solution immersed in a matrix polymer, referred to below as a gel electrolyte. In these batteries, in which the electrolyte is immobilized, it is possible to maintain contact between the electrode and the electrolyte. Thus, in these batteries, there is no necessity of sealing the electrolytic solution in the outer metallic can, while it is possible to fabricate the battery to a small thickness using a film-like exterior material.

As the external sheathing material for the battery, employing the solid electrolyte, a multi-layered film, constructed by a high molecular film or a thin metal film, may be used. In particular, the moisture-proofing multi-layer film, made up of a heat-fused resin layer and a metal foil layer, is a highly promising candidate of the external sheathing material in that is helps realize a hermetically sealed structure by hot seal, and in that the multi-layer film itself has superior strength and air-tightness, while being lighter in weight, thinner in thickness and less expensive than a metallic casing.

However, if the above-mentioned film is used as the exterior material for the battery, and a low-boiling solvent is used as solvent for the electrolyte, the internal pressure in the battery tends to be increased with an increased vapor pressure of the solvent to produce swelling in case the battery is placed in a high temperature environment. Therefore, if a film is used as eternal material for the battery, a solvent needs to be selected taking the boiling point into account.

If the gel electrolyte is to be constructed, it is impossible to construct a gel unless the solvent for the electrolyte is compatible with the matrix polymer. For this reason, the solvent needs to be selected taking into account the compatibility with respect to the matrix polymer.

The low-boiling solvent, conventionally used in the lithium ion battery, such as dimethyl carbonate, ethyl methyl carbonate or diethyl carbonate, is high in solidifying point and low in viscosity and hence is highly effective to raise the ion conductivity of the electrolyte at lower temperatures. However, these solvents cannot be used as the solvent for the gel electrolyte used as the external sheathing material for the battery due to the constraint in compatibility or boiling point.

Thus, in the gel electrolyte, ion conductivity is generally lower than the solution electrolyte, due to limitations in the usable solvents, thus leading to an increased internal resistance of the batteries. In particular, in a frigid environment, such as −20° C., the internal resistance is appreciably increased to render discharge almost impossible. That is, the low ion conductivity in the gel electrolyte frustrates attempts in improving the battery performance.

The above-mentioned problem can be solved by adding γ-butyrolactone GBL into a solvent. Since GBL is low in viscosity and in melting point, it has good ion conductivity and allows to cause large current to flow. GBL has an ion conductivity better than that of other high boiling solvents even at lower temperatures. Moreover, GBL has a higher dielectric constant and is able to dissolve an electrolyte salt to a high concentration.

Moreover, GBL is highly compatible with respect to polyvinylidene fluoride PVdF or a copolymer of PVdF and hexafluoro propylene (HFP), used as a matrix polymer of the gel electrolyte. Thus, GBL is a superior solvent if compatibility with respect to the matrix polymer for forming the gel electrolyte is also taken into account.

However, the lithium ion battery, employing GBL as a solvent for the electrolyte, is generally low in cyclic characteristics. This is felt to be ascribable to redox reaction GBL undergoes on the negative electrode. It has thus been difficult to fabricate a lithium ion secondary battery exhibiting satisfactory cyclic characteristics without impairing low temperature characteristics, load characteristics (large current characteristics) or stability of the gel electrolyte.

SUMMARY OF THE INVENTION

It is therefore an object of the present invention to provide a gel electrolyte and a gel electrolyte battery which improves ion conductivity of the solvent and which also is superior in cyclic characteristics.

In one aspect, the present invention provides a gel electrolyte including an electrolyte, a matrix polymer and a non-aqueous solvent. The non-aqueous solvent is a mixed solvent of ethylene carbonate (EC), propylene carbonate (PC) and γ-butyrolactone (GBL). The non-aqueous solvent is of a weight composition in an area in a triangular phase diagram (EC, PC, GBL) surrounded by a point (70, 30, 0), a point (55, 15, 30), a point (15, 55, 30) and a point (30, 70, 0).

In the gel electrolyte according to the present invention, the solvent composition in the gel electrolyte is optimized, so that electrolyte decomposition is suppressed to improve ion conductivity and electrically conductivity and hence the gel electrolyte is optimum for use as an electrolyte for a battery.

In another aspect, the present invention provides a gel electrolyte battery including a positive electrode containing an active material for the positive electrode, a negative electrode containing an active material for the negative electrode and which is arranged facing the positive electrode, and a gel electrolyte arranged between the positive electrode and the negative electrode. The gel electrolyte includes an electrolyte, a matrix polymer and a non-aqueous solvent. The non-aqueous solvent is a mixed solvent of ethylene carbonate (EC), propylene carbonate (PC) and γ-butyrolactone (GBL). The non-aqueous solvent is of a weight composition in an area in a triangular phase diagram (EC, PC, GBL) surrounded by a point (70, 30, 0), a point (55, 15, 30), a point (15, 55, 30) and a point (30, 70, 0).

In the gel electrolyte battery according to the present invention, , the solvent composition in the gel electrolyte is optimized, so that the gel electrolyte is improved in ion conductivity and electrically conductivity to render it possible to compromise variable battery characteristics, such as cyclic characteristics, low temperature characteristics or initial charging/discharging characteristics.

According to the present invention, a solid electrolyte in which electrolyte decomposition is suppressed to a minimum can be realized by optimizing the solvent composition in the electrolyte.

Moreover, with the use of the solid electrolyte of the present invention, a solid electrolyte may be realized which has improved cyclic characteristics and improved overall battery performance without impairing the initial charging/discharging efficiency, battery capacity, large current discharge or discharge under low temperature environment. The present solid electrolyte battery may be advantageously used as a power source for portable electronic equipments, such as portable telephone, video camera or notebook type personal computer.

DESCRIPTION OF THE PREFERRED EMBODIMENTS

Referring to the drawings, preferred embodiments of according to the present invention will be explained in detail.

Figure 1:
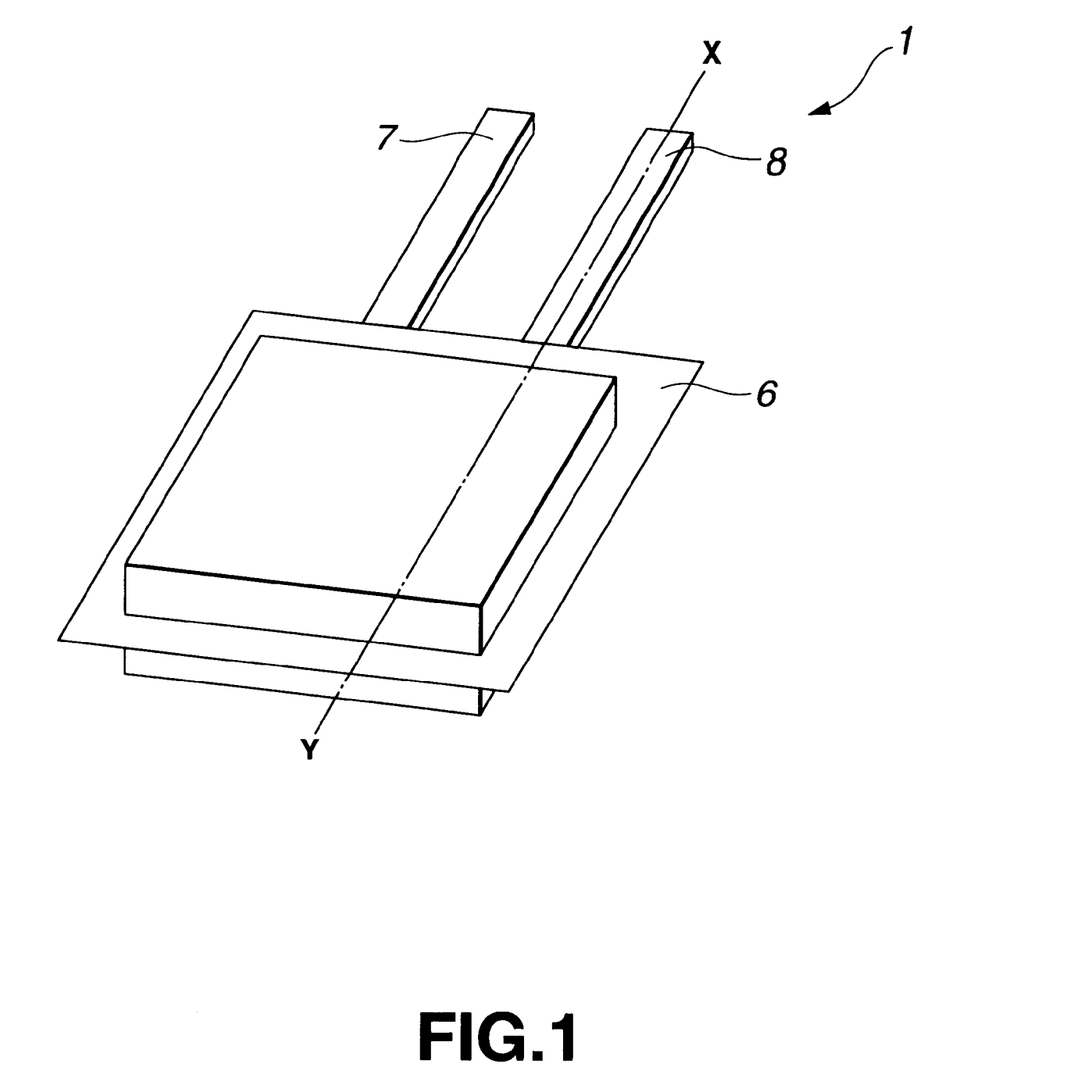
FIG. 1 is a perspective view showing an illustrative structure of a solid electrolyte battery according to the present invention.
Figure 2:
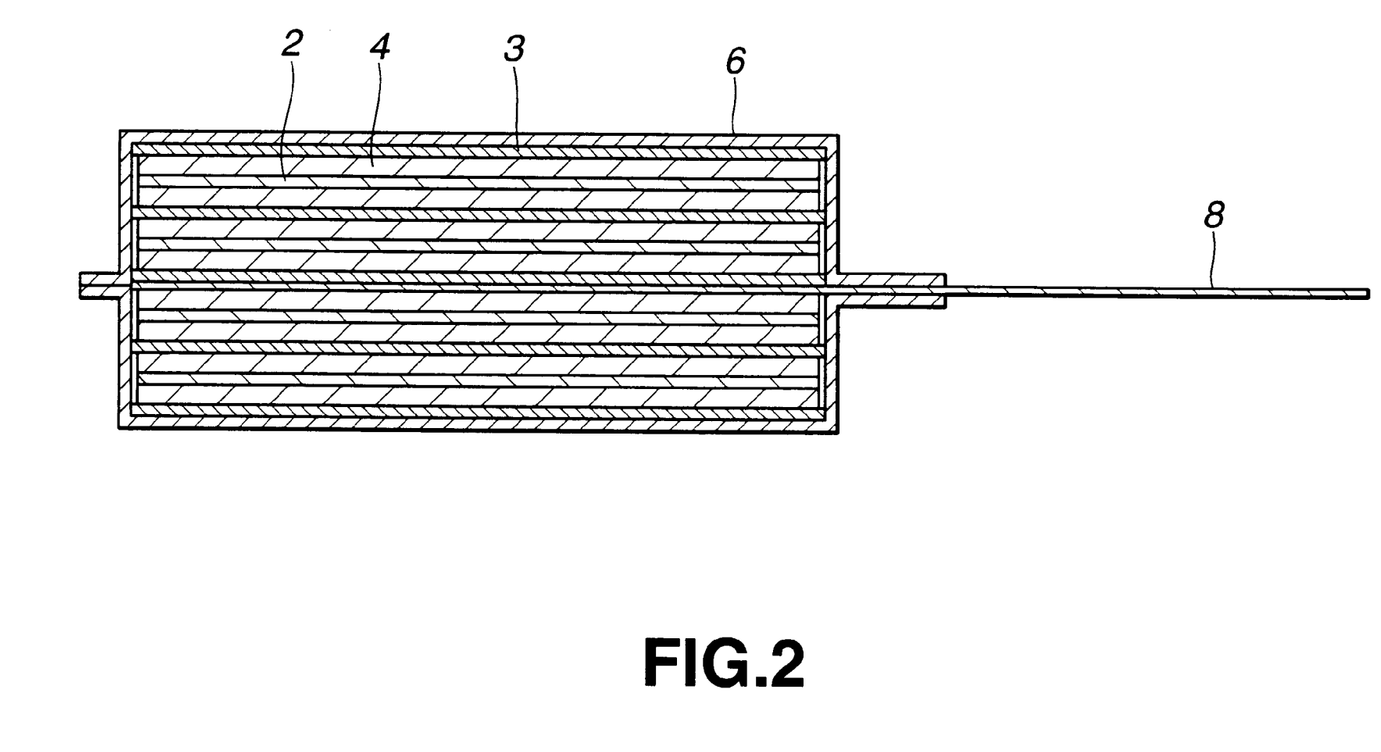
FIG. 2 is a cross-sectional view taken along line X-Y in FIG. 1.
Figure 3:
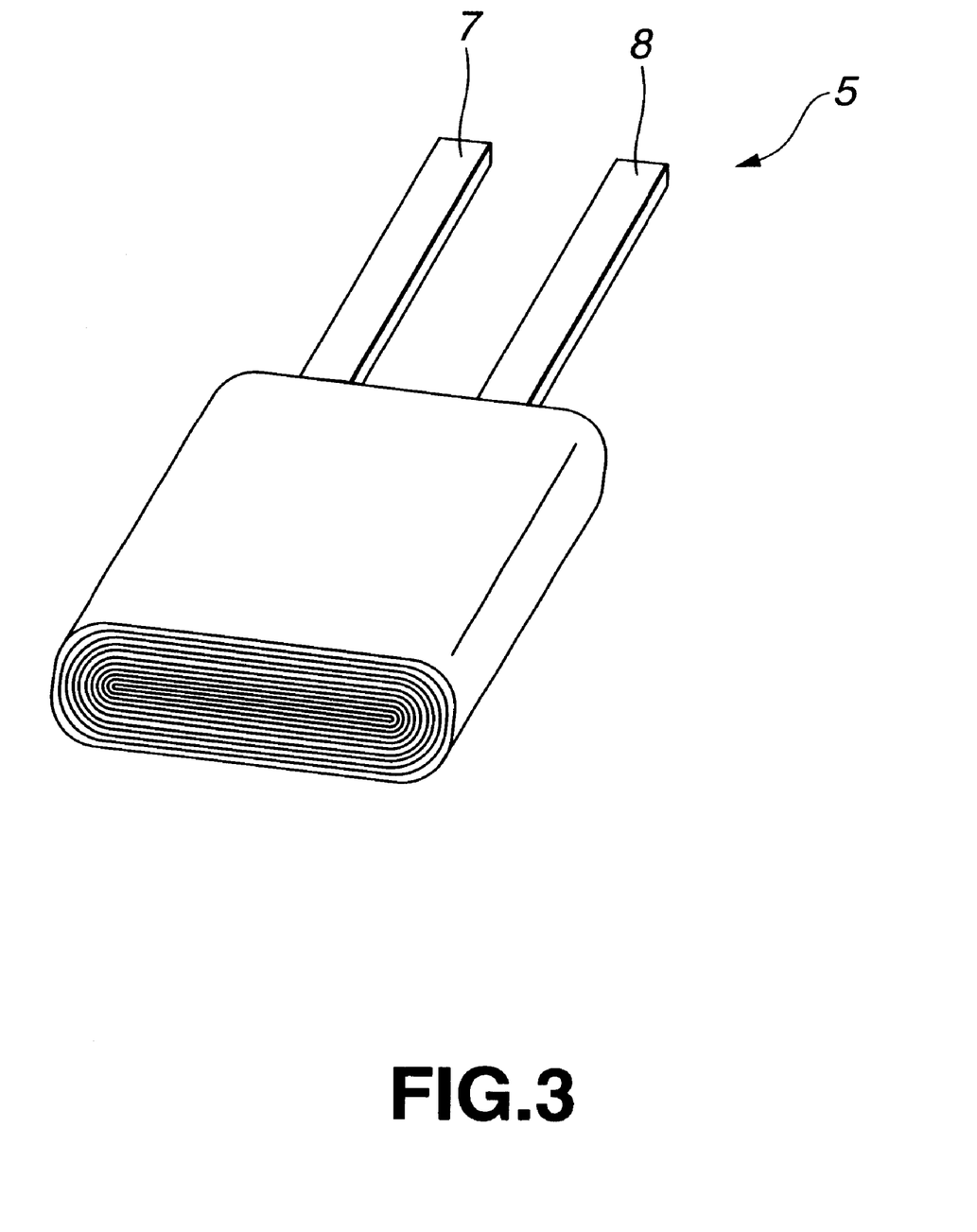
FIG. 3 is a perspective view showing the state in which a positive electrode and a negative electrode have been formed into an electrode coil.

FIGS. 1 and 2 show an illustrative structure of a gel electrolyte battery embodying the present invention. This gel electrolyte battery 1 includes a strip-shaped positive electrode 2, a strip-shaped negative electrode 3, arranged facing the positive electrode 2, and a gel electrolyte layer 4 arranged between the positive electrode 2 and the negative electrode 3. In this gel electrolyte battery 1, the positive electrode 2 and the negative electrode 3 are layered with the interposition of the gel electrolyte layer 4 and are coiled along the length to form an electrode coil 5, shown in FIG. 3. This electrode coil then is sheathed and hermetically sealed in an external film 6 formed of an insulating material. A positive electrode terminal 7 and a negative electrode terminal 8 are connected to the positive electrode 2 and to the negative electrode 3, respectively, these positive electrode terminal 7 and the negative electrode terminal 8 being clinched in a sealing opening portion forming the peripheral edge of the external film 6.

Figure 4:
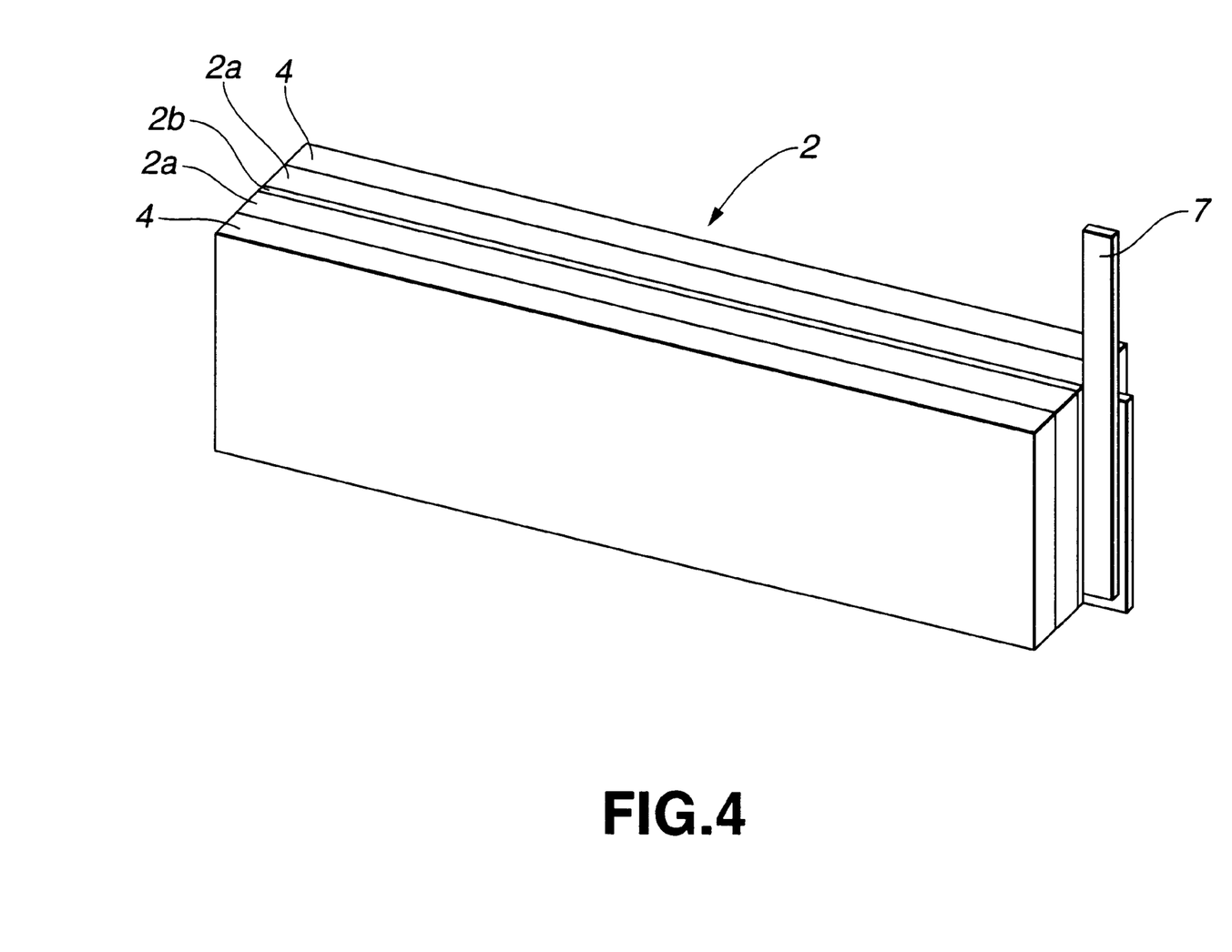
FIG. 4 is a perspective view showing an illustrative structure of a positive electrode.

The positive electrode 2 is comprised of active material layers 2a for the positive electrode 2, containing an active material for the positive electrode, formed on both surfaces of a positive electrode current collector 2b, as shown in FIG. 4. The positive electrode current collector 2b may, for example, be a metal foil, such as an aluminum foil.

The active material for the positive electrode 2 may be complex oxides, such as lithium cobaltate, lithium nickelate or lithium manganate, these complex oxides partially replaced by other transition metals, transition metal compounds, such as manganese dioxide or vanadium pentoxide, and transition metal chalcogen compounds, such as iron sulfide.

FIG. 4 shows the state in which the gel electrolyte layer 4 as later explained has been formed on the active material layers 2a for the positive electrode 2.

Figure 5:
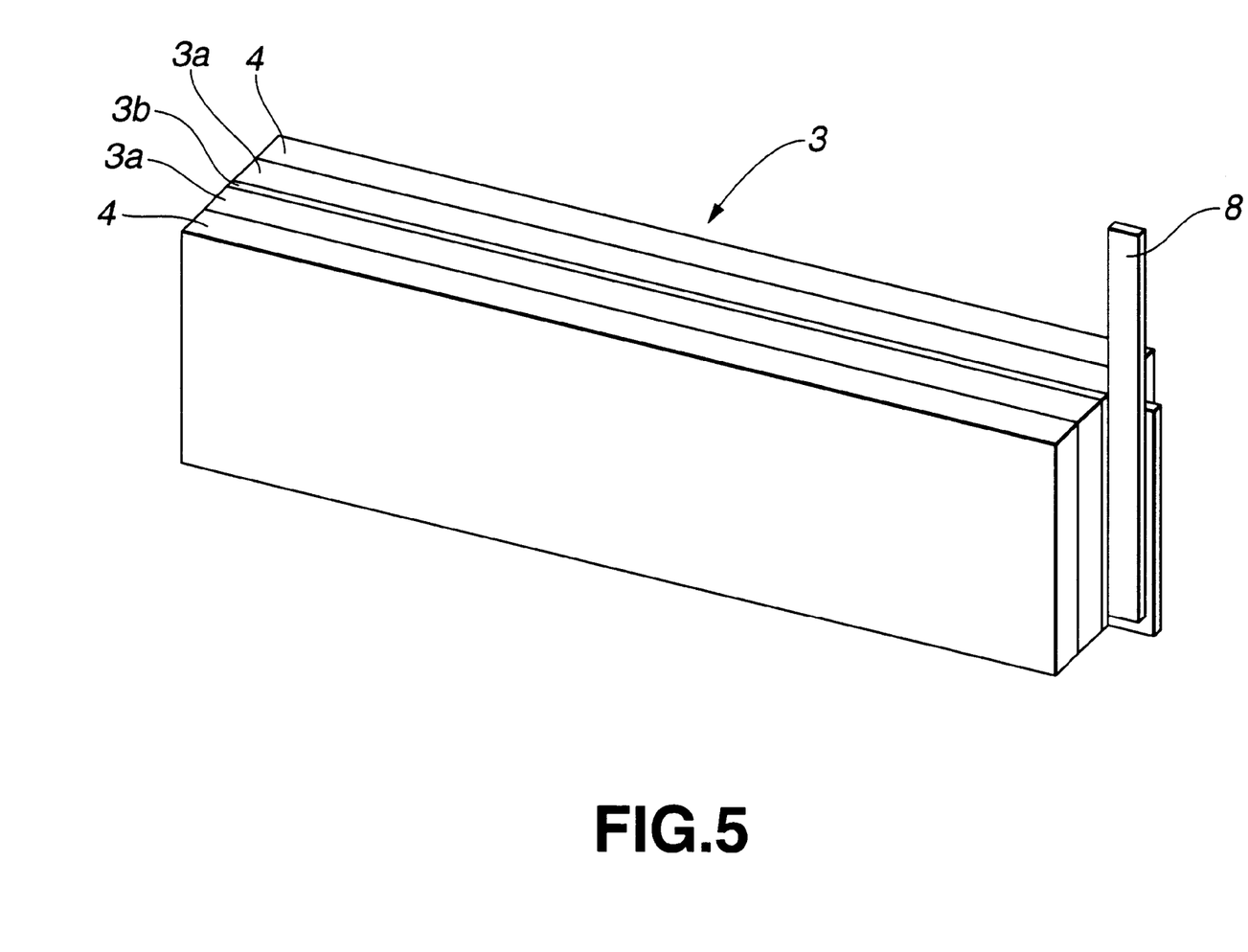
FIG. 5 is a perspective view showing an illustrative structure of a negative electrode.

In the negative electrode 3, active material layers 3a for the negative electrode 3 are formed on both surfaces of the negative electrode collector 3b. The negative electrode collector 3b may, for example, be a metal foil, such as a copper foil.

As the active material for the negative electrode, such a material that is able to dope and undope lithium can be used. The material that is able to dope and undope lithium may be enumerated by pyrocarbon, cokes, carbon blacks such as acetylene black, carbon materials, such as graphite, vitreous carbon, activated charcoal, carbon fibers, organic high molecular sintered material, sintered coffee beans, sintered cellulose or sintered bamboo, and electrically conductive polymers, such as metal lithium, lithium alloys or polyacetylene.

In FIG. 5, a gel electrolyte layer 4, as later explained, has been formed on the active material layer 3a for the negative electrode 3.

The gel electrolyte layer 4 contains an electrolytic salt, a matrix polymer and a non-aqueous solvent as a plasticizer.

As the electrolytic salt, known salts routinely used as the electrolytic salt of this sort of the gel electrolyte may be used. However, as least one of $LiPF_6$ and $LiN(CF_3SO_2)_2$ is preferably employed.

Also preferably, the electrolytic salt is dissolved in the non-aqueous solvent at a rate of 0.5 mol/kg to 1.0 mol/kg in terms of the Li ion concentration. If the concentration of the electrolytic salt is more dilute than 0.5 mol/kg, the initial charging/discharging efficiency of the gel electrolyte battery 1 is lowered. If the concentration of the electrolytic salt is thicker than 1.0 mol/kg, the initial charging/discharging efficiency is slightly improved, however, the cyclic characteristics or the low-temperature properties are lowered. Thus, the initial charging/discharging efficiency, cyclic characteristics and low-temperature properties of the gel electrolyte battery 1 can be made compatible with one another by setting the concentration of the gel electrolyte to 0.5 mol/kg to 1.0 mol/kg.

For the matrix polymer, any suitable known polymer, routinely used as the matrix polymer of this sort of the gel electrolyte, may be used. However, at least one of polyvinylidene fluoride, a copolymer of polyvinylidene fluoride and hexafluoro propylene, polyethylene oxide or polypropylene oxide, is preferably employed.

As the matrix polymer, a copolymer of PVdF and HFP, in which less than 8 wt % of PVdF is replaced by hexafluoro propylene (BHF), is preferably employed. By employing the copolymer of PVdF and HFP as the matrix polymer, compatibility with the non-aqueous solvent is improved to enable constitution of a stable gel electrolyte. Preferably, the number average molecular weight of the copolymer of PVdF and HFP is on the order of 500000 to 700000 or the weight number average molecular weight of the copolymer of PVdF and HFP is on the order of 210000 to 310000, with the intrinsic viscosity thereof being on the order of 1.7 to 2.1.

The non-aqueous solvent is composed of a mixed solvent of ethylene carbonate EC, propylene carbonate PC and γ-butyrolactone GBL. According to the present invention, the composition of the non-aqueous solvent is to be a weight composition in an area surrounded by points A (70, 30, 0), B (55, 15, 30), C (15, 55, 30) and D (30, 70, 0) in a triangular phase diagram of EC, PC and GBL, shown in FIG. 6.

The present inventors first selected a mixed solvent of ethylene carbonate EC and propylene carbonate PC as a candidate for a solvent suitably usable as the non-aqueous solvent constituting the gel electrolyte. It is noted that EC and PC are electro-chemically excellent solvents, with the boiling points thereof being as high as approximately 240° C.

However, if the proportion of EC is increased, the low-temperature properties are deteriorated, even though the cyclic characteristics are improved. Conversely, with a higher proportion of PC, the low-temperature properties are improved, however, the cyclic characteristics are lowered, whilst the solvent is decomposed to a greater extent at the time of initial charging. If polyvinylidene fluoride (PVDF) is used as the matrix polymer, compatibility of PVdF with EC and PC is not so high, with the gel stability also being not optimum. Thus, in order to improve gel stability, a third solvent having high compatibility with PVDF is required, or else it is necessary to change the solubility of PVDF by e.g., copolymerisation.

Therefore, the present inventors have selected γ-butyrolactone GBL as a third solvent to EC and PC. It is noted that GBL has a boiling point as high as approximately 200° C. and a melting point of −44° C. lower than that of EC which is 37° C. In addition, GBL is not decomposed so strongly as PC, and has a viscosity as small as 1.95×10-3 Pa.s as compared to that of PC which is 2.5×10-3 Pa.s. However, GBL, while improving low-temperature properties or electrolyte stability as compared to PC, affects the cyclic characteristics more significantly than the other two solvents.

Figure 6:
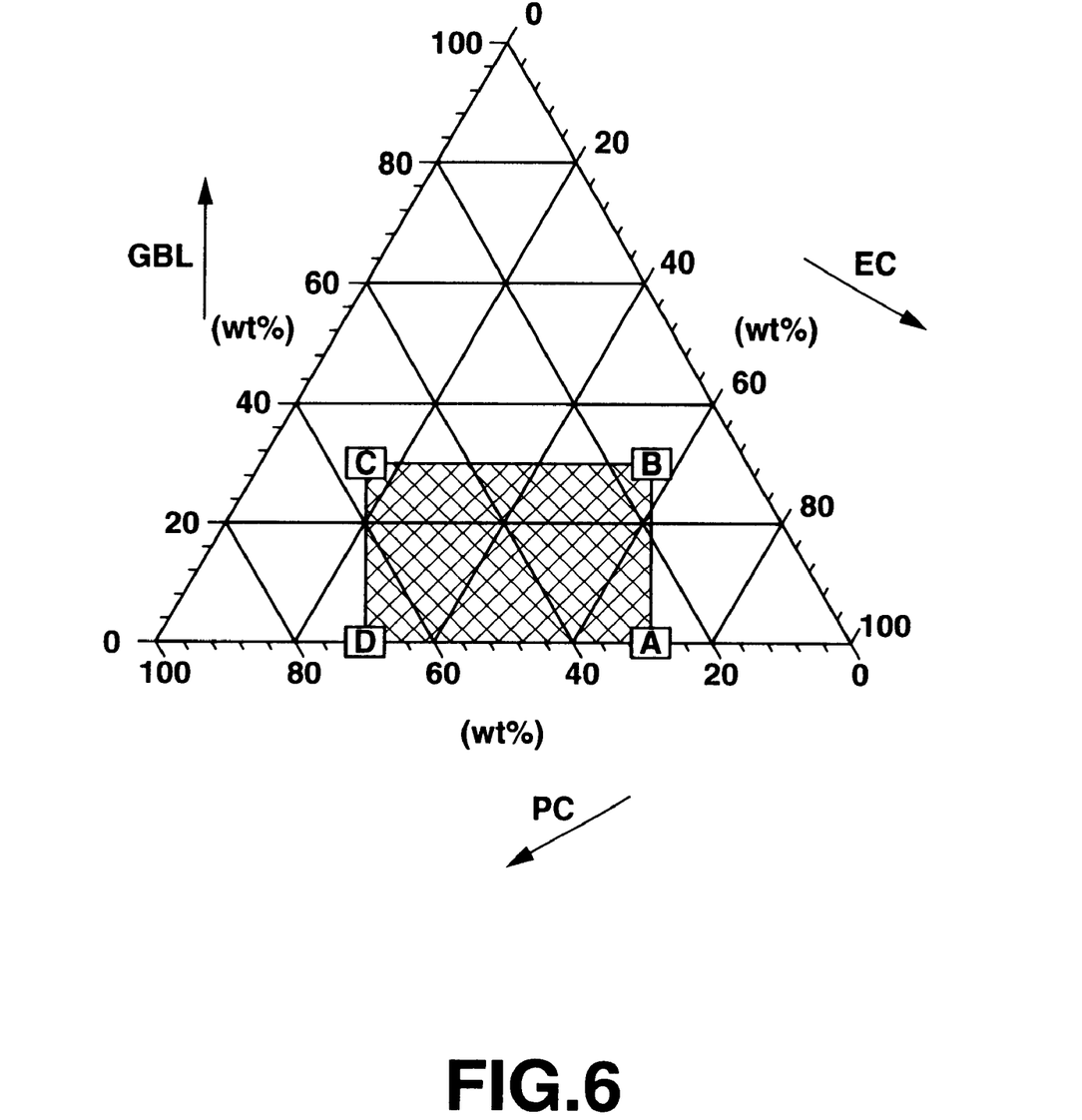
FIG. 6 is a triangular phase diagram showing a solvent composition in the gel electrolyte.

The present inventors have conducted perseverant researches into the proportions of the three components EC, PC and GBL, and arrived at a concept of setting the composition of the non-aqueous solvent to the weight composition of an area surrounded by the points A (70, 30, 0), B (55, 15, 30), C (15, 55, 30) and D (30, 70, 0) in the triangular phase diagram of EC, PC and GBL, shown in FIG. 6. By setting the composition of the non-aqueous solvent to an area defined above, battery characteristics, such as cyclic characteristics, low-temperature properties, initial charging/discharging efficiency etc can be rendered compatible relative to one another.

With an excessively large proportion of PC, that is in an area outside a boundary line C-D in the triangular phase diagram shown in FIG. 6, the cyclic characteristics as well as the initial charging/discharging efficiency are lowered appreciably.

With an excessively small proportion of EC, both the initial charging/discharging efficiency and the cyclic characteristics are lowered. With an excessively large proportion of EC, that is in an area outside the boundary line A-B in the triangular phase diagram shown in FIG. 6, both the low-temperature characteristics and the load characteristics are lowered. Also, in this area, in which there are only small amounts of EC and GBL compatible with the matrix polymer, the gel is unstable and exhibits only poor recycling characteristics.

If the proportion of GBL is small, it is impossible to improve low-temperature characteristics and the load characteristics. Also, with an excessively large proportion of PC, that is in an area outside a boundary line C-D in the triangular phase diagram shown in FIG. 6, the cyclic characteristics if the proportion of GBL is lowered. Therefore, the proportion of GBL is preferably in a range from 0 to 30%.

Thus, the composition of the non-aqueous solvent by weight ratio is set to the weight composition of the area surrounded by the points A (70, 30, 0), B (55, 15, 30), C (15, 55, 30) and D (30, 70, 0) in the triangular phase diagram of EC, PC and GBL, shown in FIG. 6 to suppress electrolyte decomposition to a minimum. By constituting the gel electrolyte using this non-aqueous solvent, a high-performance gel electrolyte battery 1 can be realized which has a high initial charging/discharging characteristics, sufficiently tolerable low-temperature characteristics or large current discharge and superior cyclic characteristics.

Also, difluoro anisole may be added to the non-aqueous solvent. By so doing, it is possible to improve initial charging/discharging characteristics, low-temperature characteristics or cyclic characteristics. This effect is manifested most appreciably in a PC-rich composition area. If difluoro anisole is added to the non-aqueous solvent, the amount of difluoro anisole addition is preferably 0.3 to 2 wt % based on the weight of the non-aqueous solvent.

The above-described gel electrolyte battery 1 according to the present invention exhibits a large capacity even under a frigid environment, and hence has long cyclic service life characteristics. Also, if a laminate film is used as an external sheathing material, the present gel electrolyte battery 1 is not swollen due to solvent volatilization under a high temperature environment of e.g., 60° C.

Since the gel electrolyte battery 1 can be reduced in size and in thickness, it can be used most effectively as a power source of a portable electronic equipment, such as a notebook personal computer, portable telephone or video camera.

The manufacturing method of the gel electrolyte battery 1 is hereinafter explained.

As for the positive electrode 2, a positive electrode mixture, containing an active material for the positive electrode and a binder, is evenly coated on a metal foil, e.g., an aluminum foil, operating as a positive electrode current collector 2b, and dried in situ, to form the active material layers 2a for the positive electrode 2 to fabricate a positive electrode sheet. As the binder for the positive electrode mixture, any suitable known binder may be used. In addition, any known suitable addition agents etc may be added to the positive electrode mixture.

The gel electrolyte layers 4 then are formed on the active material layers 2a for the positive electrode 2. For forming the gel electrolyte layers 4, the electrolytic salt first is dissolved in the non-aqueous solvent to prepare a non-aqueous electrolytic solution. The matrix polymer is added to the non-aqueous electrolytic solution and stirred to dissolve the matrix polymer to prepare a sol of the electrolytic solution.

According to the present invention, there is employed a mixed solvent comprised of ethylene carbonate EC, propylene carbonate PC and γ-butyrolactone GBL, mixed in weight proportions within the area surrounded by the points A (70, 30, 0), B (55, 15, 30), C (15, 55,30) and D (30, 70, 0) in the triangular phase diagram. By setting the composition of the non-aqueous solvent in this manner, the battery characteristics, such as cyclic characteristics, low-temperature characteristics or the initial charging/discharging characteristics can be made compatible with one another.

A pre-set amount of this electrolytic salt then is coated on the active material layers 2a of the positive electrode 2. The resulting assembly then is cooled at room temperature to allow the matrix polymer to be gelled to form the gel electrolyte layers 4 on the active material layers 2a.

The positive electrode sheet, carrying the gel electrolyte layer 4, is sliced in as a strip. In the portions of the positive electrode current collector 2b, not carrying the active material layer 2a, a lead wire of e.g., aluminum, is welded so as to be used as a positive electrode terminal 7. This completes the strip-shaped positive electrode 2 carrying the gel electrolyte layer 4.

As for the negative electrode 3, a negative electrode mixture containing the active material for the negative electrode and the binder is evenly coated on a metal foil, such as copper foil, operating as the negative electrode collector 3b, and dried in situ to form the active material layers 3a of the negative electrode 3 to complete a negative electrode sheet. As the binder of the negative electrode mixture, not only known binders can be used, but also known addition agents etc can be added to the negative electrode mixture.

Then, gel electrolyte layers 4 are formed on the negative electrode collector 3b of the negative electrode sheet. For forming the gel electrolyte layers 4, a pre-set amount of the electrolytic salt, prepared as described above, is coated on the negative electrode collector 3b. The resulting assembly then is allowed to cool at room temperature to allow the matrix polymer to be gelled to form the gel electrolyte layers 4 on the negative electrode collector 3b.

The negative electrode sheet, carrying the gel electrolyte layers 4, is sliced in strips. A lead wire of e.g., nickel is welded to a portion of the negative electrode collector 3b not coated with the active material layers 3a for the negative electrode 3 to provide a negative electrode terminal 8. This completes a strip-shaped negative electrode 3 carrying the gel electrolyte layers 4.

Plural strip-shaped positive and negative electrodes 2, 3 are bonded together with the sides carrying the gel electrolyte layers 4 facing each other to complete a layered electrode assembly. This layered electrode assembly is then coiled in the longitudinal direction to form the electrode coil 5.

Finally, this electrode coil 5 is packed by an external film 6 formed of an insulating material and a positive electrode terminal 7 and a negative electrode terminal 8 are clinched in the sealing opening to complete the gel electrolyte battery 1.

In packing the electrode coil 5 in the external film 6, a resin piece may be arranged in contact portion between the external film 6 and the the positive electrode terminal 7 and the negative electrode terminal 8. By arranging the resin piece in this manner, it is possible to prevent shorting of the external film 6 due to burrs on the external film 6 to improve contact properties between the external film 6 and the the positive electrode terminal 7 and the negative electrode terminal 8.

In the above-described embodiment, the strip-shaped positive electrode 2 and negative electrode 3 are layered together and coiled in the longitudinal direction to form the electrode coil 5. The present invention is, however, not limited to this configuration since it may also be applied to a layered electrode assembly comprised of rectangular positive electrodes and rectangular negative electrodes or to an assembly comprised of alternately layered electrode assemblies.

The gel electrolyte battery 1 of the present embodiment may be cylindrically-shaped, square-shaped or coin-shaped, without any limitations. Also, the present invention may be applied to both the primary and secondary batteries.

EXAMPLES

For confirming the advantageous effect of the present invention, a gel electrolyte battery was fabricated in the following manner to evaluate its characteristics.

Example 1

First, a positive electrode an a negative electrode were fabricated.

For fabricating the positive electrode, 92 wt % of lithium cobaltate ($LiCoO_2$), 3 wt % of powdered polyvinylidene fluoride and 5 wt % of powdered graphite were dispersed in N-methyl pyrrolidone (NMP) to form a slurry, which slurry was coated on both surfaces of an aluminum foil as a positive electrode current collector. The resulting product was dried at 100° C. for 24 hours under reduced pressure. The dried product was compressed by a roll press operating under a suitable pressure to give a positive electrode sheet.

This positive electrode sheet was sliced to a rectangular shape 50 mm by 300 mm and a lead of an aluminum foil 50 μm in thickness was welded to a portion of the positive electrode current collector not coated with the positive electrode mixture to serve as a positive electrode terminal. This produced a positive electrode.

For fabricating a negative electrode, 91 wt % of artificial graphite and 9 wt % of powdered polyvinylidene fluoride were dispersed in NMP to form a slurry. This slurry was coated on both sides of the copper foil as a negative electrode current collector and dried at 100° C. for 24 hours under reduced pressure. The dried product was compressed by a roll press operating under a suitable pressure to give a negative electrode sheet.

This negative electrode sheet was sliced to a rectangular shape 52 mm by 320 mm and a lead of a copper or nickel foil 50 μm in thickness was welded to a portion of the negative electrode current collector not coated with the negative electrode mixture so as to serve as a negative electrode terminal. This produced a negative electrode.

A PVDF based gel electrolyte was then prepared as an electrolyte.

In preparing the gel electrolyte, a PVDF (polyvinylidene fluoride)—HPF (hexafluoro propylene) copolymer, in which 7 wt % of PVDF is replaced by HFP, an electrolytic solution and dimethyl carbonate (DMC), a solvent for polymers, were mixed together at a weight ratio of 1:5:8 and stirred at 75° C. to give a sol-like electrolytic solution. If difluoro anisole is to be added, it was added at this time.

The electrolytic solution was prepared by dissolving lithium phosphate hexafluoride ($LiPF_6$) in a solvent obtained on mixing ethylene carbonate EC, propylene carbonate PC and γ-butyrolactone GBL at a weight ratio of EC=30%, PC=70% and GBL=0%, so that the amount of lithium phosphate hexafluoride ($LiPF_6$) in the solvent will be 0.76 mol/kg. Meanwhile, the solvent composition corresponds to a point D in the triangular phase diagram of FIG. 7.

Then, using a bar coater, the above-mentioned electrolytic solution was coated on the active material layers of the positive electrode 2 and the active material layers of the negative electrode 3, and the solvent was volatilized in a vessel maintained at a constant temperature of 70° C. to form a gel electrolyte layer. The positive and negative electrodes then were layered together, with the gel electrolyte layers in-between, and coiled in the longitudinal direction to form an electrode coil. Finally, this electrode coil was packed in vacuum with a general-purpose laminate film, comprised of an aluminum foil sandwiched between polyolefin films. The positive electrode terminal and the negative electrode terminal were clinched in the sealing opening to complete the gel electrolyte battery.

Examples 1 to 32

The gel electrolyte batteries were prepared in the same way as in Example 1 except using the composition of the gel electrolyte shown in Table 1.

Meanwhile, in Example 21, $LiN(CF_3SO_2)_2$ was used as an electrolytic salt in place of $LiPF_6$.

In Example 22, lithium nickel cobaltate $LiCo_{0.8}Ni_{0.2}O_2$ was used as the active material for the positive electrode in place of lithium cobaltate, whilst carbon difficult to graphize was used as the active material for the negative electrode in place of artificial graphite.

Also, in Examples 23 to 28, difluoro anisole was added in an amount of 1 wt % to the solvent used in the electrolytic solution.

TABLE 1

| | EC (wt %) | PV (wt %) | GBL (wt %) | electrolytic salt (mol/kg) | position in triangular phase diagram |
|---|---|---|---|---|---|
| Ex.1 | 30 | 70 | 0 | 0.76 | D |
| Ex.2 | 40 | 60 | 0 | 0.76 | a |
| Ex.3 | 50 | 50 | 0 | 0.50 | i |
| Ex.4 | 50 | 50 | 0 | 0.76 | i |
| Ex.5 | 50 | 50 | 0 | 1.00 | i |
| Ex.6 | 60 | 40 | 0 | 0.76 | u |
| Ex.7 | 70 | 30 | 0 | 0.76 | A |
| Ex.8 | 30 | 60 | 10 | 0.76 | e |
| Ex.9 | 40 | 50 | 10 | 0.50 | o |
| Ex.10 | 40 | 50 | 10 | 0.76 | o |
| Ex.11 | 40 | 50 | 10 | 1.00 | o |
| Ex.12 | 50 | 40 | 10 | 0.76 | ka |
| Ex.13 | 60 | 30 | 10 | 0.76 | ki |
| Ex.14 | 30 | 50 | 20 | 0.76 | ku |
| Ex.15 | 50 | 30 | 20 | 0.76 | ke |
| Ex.16 | 15 | 55 | 30 | 0.76 | C |
| Ex.17 | 25 | 45 | 30 | 0.76 | ko |
| Ex.18 | 35 | 35 | 30 | 0.76 | sa |
| Ex.19 | 45 | 25 | 30 | 0.76 | si |
| Ex.20 | 55 | 15 | 30 | 0.76 | B |
| Ex.21 | 40 | 50 | 10 | 0.76 | o |
| Ex.22 | 40 | 50 | 10 | 0.76 | o |
| Ex.23 | 30 | 70 | 0 | 0.76 | D |
| Ex.24 | 40 | 60 | 0 | 0.76 | a |
| Ex.25 | 50 | 50 | 0 | 0.50 | i |
| Ex.26 | 60 | 40 | 0 | 0.76 | u |
| Ex.27 | 70 | 30 | 0 | 0.76 | A |
| Ex.28 | 40 | 50 | 10 | 0.50 | o |
| Ex.29 | 50 | 50 | 0 | 0.40 | i |
| Ex.30 | 50 | 50 | 0 | 1.10 | i |
| Ex.31 | 40 | 50 | 10 | 0.40 | o |
| Ex.32 | 40 | 50 | 10 | 1.10 | o |

Comparative Examples 1 to 10

Gel electrolyte batteries were prepared in the same way as in Example 1 except setting the composition of the gel electrolyte as shown in Table 2.

TABLE 2

| | EC (wt %) | PC (wt %) | GBL (wt %) | electrolytic salt | position in triangular phase diagram |
|---|---|---|---|---|---|
| Comp. Ex.1 | 20 | 80 | 0 | 0.76 | su |
| Comp. Ex.2 | 20 | 70 | 10 | 0.76 | se |
| Comp. Ex.3 | 10 | 60 | 30 | 0.76 | so |
| Comp. Ex.4 | 10 | 50 | 40 | 0.76 | ta |
| Comp. Ex.5 | 25 | 35 | 40 | 0.76 | ti |
| Comp. Ex.6 | 35 | 25 | 40 | 0.76 | tu |
| Comp. Ex.7 | 50 | 10 | 40 | 0.76 | te |
| Comp. Ex.8 | 60 | 10 | 30 | 0.76 | to |
| Comp. Ex.9 | 70 | 20 | 10 | 0.76 | na |
| Comp. Ex.10 | 80 | 20 | 0 | 0.76 | ni |

On the gel electrolyte batteries, fabricated as described above, cyclic characteristics, initial discharging capacity holding rate, low-temperature discharge characteristics and load characteristics were valuated.

As to cyclic characteristics, constant current constant voltage charging at 4.2 V and 1C and cut-off constant current discharging at 3V and 1C were carried out and measurements were made of chronological changes of the discharge capacity. The evaluation was made in terms of the capacity holding rate after 300 cycles:

(discharge, capacity at the 300th cycle)/(discharge capacity at the fifth cycle).

The holding rate 75% or higher was retained to be acceptable. The capacity holding rate of 75% after 300 cycles is a value currently required in the specifications for the portable electronic equipments.

As to the initial discharging capacity holding rate, constant current constant voltage charging at 4.2 V and 0.1 C and cut-off constant current discharging at 3V were carried out and evaluation was made from the charging/discharging battery capacity at this time:

(initial discharging capacity)/(initial charging capacity).

The ratio value not less than 75% was retained to be acceptable. If the initial discharging capacity holding rate is too low, the waste of the introduced active material is significant.

The low-temperature discharge characteristics were evaluated in terms of the ratio of 0.5C discharge capacity at −20° C. and at 23° C.:

(0.5C discharge capacity at −20° C.)/(0.5C discharge capacity at 23° C.).

The ratio value 28% or higher was retained to be acceptable. This value is equivalent to the battery capacity necessary to have an emergency rescue request call at least once with e.g., a portable telephone.

The load characteristics were evaluated in terms of the ratio of the capacity of 3C to that of 0.5C at room temperature:

(3C discharge capacity)/(0.5C discharge capacity).

The ratio value 90% or higher was retained to be acceptable. Since the portable telephone consumes power by pulse discharge, large current characteristics are required. The load characteristics of 90% or higher represent a value necessary to meet the request for the telephone.

It is noted that 1C means the current value for which the rated capacity of a battery is discharged in one hour, whilst 0.2C, 0.5C and 3C mean the current values for which the rated capacity of the battery is discharged in five hours, two hours and in 20 minutes, respectively.

The results of evaluation of the cyclic characteristics, initial charging/discharging efficiency, low-temperature characteristics and the load characteristics, conducted for the batteries of Examples 1 to 32, are shown in Table 3.

TABLE 3

|  | cyclic characteristics (%) | initial charging/ discharging efficiency (%) | low temperature characteristics (%) | load characteristics (%) | position in triangular phase diagram |
|---|---|---|---|---|---|
| Ex.1 | 80 | 75 | 39 | 95 | D |
| Ex.2 | 86 | 79 | 37 | 94 | a |
| Ex.3 | 88 | 84 | 33 | 92 | i |
| Ex.4 | 86 | 86 | 32 | 93 | i |
| Ex.5 | 84 | 86 | 30 | 91 | i |
| Ex.6 | 90 | 87 | 30 | 92 | u |
| Ex.7 | 83 | 88 | 28 | 90 | A |
| Ex.8 | 80 | 80 | 36 | 94 | e |
| Ex.9 | 89 | 80 | 35 | 92 | o |
| Ex.10 | 88 | 84 | 34 | 93 | o |
| Ex.11 | 86 | 86 | 32 | 91 | o |
| Ex.12 | 86 | 84 | 33 | 92 | ka |
| Ex.13 | 82 | 84 | 29 | 92 | ki |
| Ex.14 | 82 | 80 | 35 | 95 | ku |
| Ex.15 | 80 | 82 | 30 | 93 | ke |
| Ex.16 | 75 | 75 | 40 | 97 | C |
| Ex.17 | 77 | 77 | 38 | 96 | ko |
| Ex.18 | 78 | 78 | 35 | 95 | sa |
| Ex.19 | 78 | 80 | 31 | 93 | si |
| Ex.20 | 78 | 81 | 29 | 92 | B |
| Ex.21 | 88 | 83 | 34 | 93 | o |
| Ex.22 | 90 | 82 | 34 | 93 | o |
| Ex.23 | 83 | 80 | 42 | 95 | D |
| Ex.24 | 89 | 84 | 40 | 94 | a |
| Ex.25 | 92 | 88 | 35 | 93 | i |
| Ex.26 | 92 | 90 | 33 | 92 | u |
| Ex.27 | 84 | 91 | 31 | 90 | A |
| Ex.28 | 92 | 88 | 37 | 93 | o |
| Ex.29 | 79 | 70 | 26 | 84 | i |
| Ex.30 | 74 | 87 | 20 | 80 | i |
| Ex.31 | 79 | 70 | 27 | 86 | o |
| Ex.32 | 75 | 87 | 23 | 82 | o |

The results of evaluation on cyclic characteristics, initial charging/discharging efficiency, low-temperature characteristics and the load characteristics, conducted for the batteries of Comparative Examples 1 to 10, are shown in Table 3.

TABLE 4

|  | cyclic characteristics (%) | initial charging/ discharging efficiency (%) | low- temperature characteristics (%) | load characteristics (%) | position in triangular phase diagram |
|---|---|---|---|---|---|
| Comp. Ex.1 | 70 | 66 | 38 | 96 | su |
| Comp. Ex.2 | 65 | 73 | 38 | 97 | se |
| Comp. Ex.3 | 62 | 69 | 41 | 97 | so |
| Comp. Ex.4 | 50 | 64 | 45 | 97 | ta |
| Comp. Ex.5 | 61 | 68 | 38 | 96 | ti |
| Comp. Ex.6 | 65 | 72 | 33 | 94 | tu |
| Comp. Ex.7 | 70 | 80 | 20 | 94 | te |
| Comp. Ex.8 | 66 | 82 | 11 | 89 | to |
| Comp. Ex.9 | 70 | 86 | 8 | 87 | na |
| Comp. Ex.10 | 73 | 87 | 5 | 86 | ni |

Figure 7:
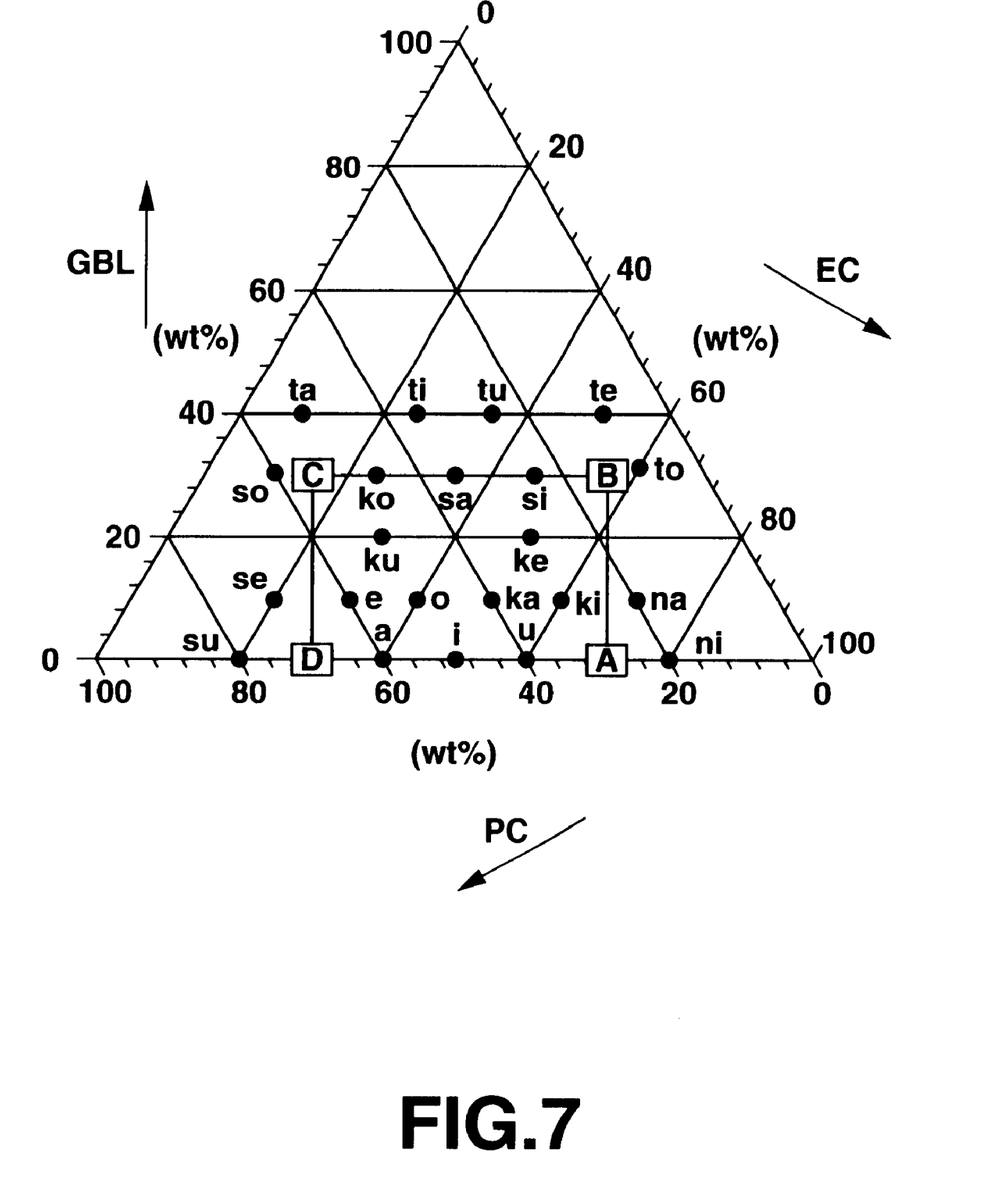
FIG. 7 is again a triangular phase diagram showing a solvent composition in the gel electrolyte.

It is seen from Table 4 that, if the proportion of PC and that of EC are increased and decreased, respectively, that is if the non-aqueous solvent is set to a composition shown by points su to so in the triangular phase diagram shown in FIG. 7, the cyclic characteristics and the initial charging/discharging efficiency are both lowered.

On the other hand, if the proportion of GBL is increased, that is if the non-aqueous solvent is set to the composition shown by points ta to te in the triangular phase diagram shown in FIG. 7, the cyclic characteristics are lowered.

If the proportion of EC is increased, that is if the non-aqueous solvent is set to the composition shown by points to to ni in the triangular phase diagram shown in FIG. 7, the low-temperature characteristics and the load characteristics are lowered. Also, in this area, the amounts of EC and GBL compatible with the matrix polymer, are small, so that the gel is unstable, whilst the cyclic characteristics are also inferior.

It is also seen from Table 3 that, in the Examples 1 to 32 in which the composition of the non-aqueous solvent is the weight composition of an area surrounded by a point A (70, 30, 0), a point B (55, 15, 30), a point C (15, 55, 30) and a point D (30, 70, 0) in the triangular phase diagram (EC, PC, GBL) shown in FIG. 7, that is the composition indicated by points a to si, the cyclic characteristics, initial charging/discharging efficiency, low-temperature characteristics and the load characteristics are optimum.

Thus, if the composition of the non-aqueous solvent is the weight composition of the area surrounded by the point A (70, 30, 0), a point B (55, 15, 30), a point C (15, 55, 30) and a point D (30,70, 0) in the triangular phase diagram (EC, PC, GBL) shown in FIG. 7, a high performance gel electrolyte battery can be realized in which requirements for a high initial charging/discharging efficiency, low-temperature characteristics and for the large current discharging are met and which is superior in cyclic characteristics.

If the non-aqueous solvent having the above-mentioned composition is used, particularly satisfactory characteristics are realized in the Examples 1 to 28 in which the concentration of the electrolytic salt of the electrolytic solution is set to 0.5 mol/kg to 1.0 mol/kg in terms of the Li ion concentration. In the Examples 29 to 31, in which the concentration of the electrolytic salt is less than 0.5 mol/kg, the initial charging/discharging efficiency is not optimum. In the Examples 30 and 32, in which the concentration of the electrolytic salt is larger than 1.0 mol/kg, the cyclic characteristics or the low-temperature characteristics are lowered, even though the initial charging/discharging efficiency is slightly improved.

It is also seen from comparison of Examples 1 and 23, Examples 2 and 24, Examples 3 and 25, Examples 6 and 26, Example 7 and 27 and comparison of the Example 9 and 28, addition of difluoro anisole to the non-aqueous solvent leads to further improvement in the initial charging/discharging efficiency, cyclic characteristics and in the low-temperature characteristics.

What is claimed is:

1. A gel electrolyte comprising:
   an electrolyte;
   a matrix polymer selected from the group consisting of a polyvinylidene fluoride/hexafluoro propylene copolymer, polyethylene oxide and polypropylene oxide; and
   a non-aqueous solvent comprising from approximately 15 weight % to approximately 70 weight % of ethylene carbonate (EC), from approximately 15 weight % to approximately 70 weight % of propylene carbonate (PC), and from greater than 0 weight % to approximately 30 weight % of γ-butyrolactone (GBL).

2. The gel electrolyte according to claim 1 wherein said electrolyte comprises at least one of $LiPF_6$ and $Li(CF_9SO_2)_2$, and wherein said non-aqueous solvent comprises said electrolyte in a proportion of 0.5 mol/kg to 1.0 mol/kg in terms of the Li ion concentration.

3. The gel electrolyte according to claim 1 wherein said matrix polymer comprises a high molecular material having a number average molecular weight of 500000 to 700000, obtained on copolymerizing hexafluoro propylene to vinylidene fluoride in a weight ratio less than 8 wt %.

4. The gel electrolyte according to claim 1 wherein difluoro anisole is added to said non-aqueous solvent.

5. A gel electrolyte battery comprising:
   a spiral coil formed through a separator by winding a positive electrode;
   the positive electrode further having two sides, of which on each side contains an active material for the positive electrode;
   a negative electrode, the negative electrode further having two sides, of which one each side contains an active material for the negative electrode, the negative electrode being arranged facing the positive electrode; and
   a gel electrolyte arranged between the positive electrode and the negative electrode;
   the gel electrolyte comprising
     an electrolyte;
     a matrix polymer selected from a group consisting a polyvinylidene fluroide/hexafluoro propylene copolymer, polyethylene oxide and polypropylene oxide; and
     a non-aqueous solvent comprising from approximately 15 weight % to approximately 70 weight % of ethylene carbonate (EC), from approximately 15 weight % to approximately 70 weight % of propylene carbonate (PC), and from greater than 0 weight % to approximately 30 weight % of γ-butyrolactone (GBL).

6. The gel electrolyte according to claim 5 wherein the electrolyte comprises at least one of $LiPF_6$ and $Li(CF_9SO_2)_2$, and wherein the non-aqueous solvent comprises the electrolyte in a proportion of 0.5 mol/kg to 1.0 mol/kg in terms of the Li ion concentration.

7. The gel electrolyte battery according to claim 6 wherein said matrix polymer comprises a high molecular material having a number average molecular weight of 500000 to 700000, obtained on copolymerizing hexafluoro propylene to vinylidene fluoride in a weight ratio less than 8 wt %.

8. The gel electrolyte battery according to claim 5 wherein difluoro anisole is added to said non-aqueous solvent.

9. The gel electrolyte of claim 1, wherein the electrolyte comprises at least one of $LiPF_6$ and $Li(CF_9SO_2)_2$, and wherein the non-aqueous solvent comprises the electrolyte in a proportion of 0.5 mol/kg to 1.0 mol/kg in terms of the Li ion concentration;
   the matrix polymer comprises a high molecular material having a number average molecular weight of 500000 to 700000, obtained on copolymerizing hexafluoro propylene to vinylidene fluoride in a weight ratio less than 8 wt %; and
   wherein difluoro anisole ad added to the non-aqueous solvent.

10. The gel electrolyte of claim 5, wherein the electrolyte comprises at least one of $LiPF_6$ and $Li(CF_9SO_2)_2$, and wherein the non-aqueous solvent comprises the electrolyte in a proportion of 0.5 mol/kg to 1.0 mol/kg in terms of the Li ion concentration;
   the matrix polymer comprises a high molecular material having a number average molecular weight of 500000 to 700000, obtained on copolymerizing hexafluoro propylene to vinylidene fluoride in a weight ratio less than 8 wt %; and
   wherein difluoro anisole is added to the non-aqueous solvent.

11. A gel electrolyte comprising:
    an electrolyte;
    a matrix polymer selected from the group consisting of a polyvinylidene fluoride/hexafluoro propylene copolymer, polyethylene oxide and polypropylene oxide; and
    a non-aqueous solvent comprising from approximately 15 weight % to approximately 70 weight % of ethylene carbonate (EC), from approximately 15 weight % to approximately 70 weight % of propylene carbonate (PC), and from greater than 0 weight % to approximately 30 weight % of γ-butyrolactone (GBL); and
    wherein difluoro anisole is added to the non-aqueous solvent.

* * * * *